United States Patent
Lang et al.

(10) Patent No.: US 10,151,258 B2
(45) Date of Patent: Dec. 11, 2018

(54) METHOD AND ENGINE CONTROL DEVICE FOR IDENTIFYING A LONGITUDINAL JERKING OF A MOTOR VEHICLE

(71) Applicant: Volkswagen Aktiengesellschaft, Wolfsburg (DE)

(72) Inventors: Leonhard Lang, Braunschweig (DE); Sönke Jess, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 15/590,954

(22) Filed: May 9, 2017

(65) Prior Publication Data

US 2017/0241358 A1    Aug. 24, 2017

Related U.S. Application Data

(63) Continuation of application No. PCT/EP2015/076473, filed on Nov. 12, 2015.

(30) Foreign Application Priority Data

Nov. 25, 2014  (DE) .................. 10 2014 224 030

(51) Int. Cl.
*F02D 41/00* (2006.01)
*G01P 3/80* (2006.01)
(Continued)

(52) U.S. Cl.
CPC ......... *F02D 41/0087* (2013.01); *B60W 30/20* (2013.01); *B60W 40/107* (2013.01);
(Continued)

(58) Field of Classification Search
CPC ...... F02D 41/00; F02D 41/0087; G01P 1/023; G01P 1/026; G01P 1/12; G01P 3/80;
(Continued)

(56) References Cited

U.S. PATENT DOCUMENTS 5,608,631 A * 3/1997 Tsutsumi ............ B60T 8/17616
                                                    700/304
5,867,803 A    2/1999 Kim et al.
(Continued)

FOREIGN PATENT DOCUMENTS

DE       19722148 A1    12/1997
DE       10308627 A1    4/2004
(Continued)

OTHER PUBLICATIONS

Search Report including Provisional Assessment of Patentability issued by the German Patent and Trademark Office for German Patent Application No. DE 10 2014 224 030.1, dated Aug. 27, 2015.
(Continued)

*Primary Examiner* — John Kwon
*Assistant Examiner* — Johnny H Hoang
(74) *Attorney, Agent, or Firm* — Manfred Beck, P.A.

(57) ABSTRACT

A method for identifying a longitudinal jerking of a motor vehicle is provided, wherein a wheel speed of a driven wheel and a wheel speed of a non-driven wheel are recorded and wherein the longitudinal jerking of the motor vehicle is detected on the basis of a change in the measured wheel speeds. The detection of the longitudinal jerking is improved by comparing the change in the wheel speed of the driven wheel with the change in the wheel speed of the non-driven wheel in order to detect a longitudinal jerking as a result of a vibration stimulation in the drive train.

7 Claims, 2 Drawing Sheets

Figure 1:
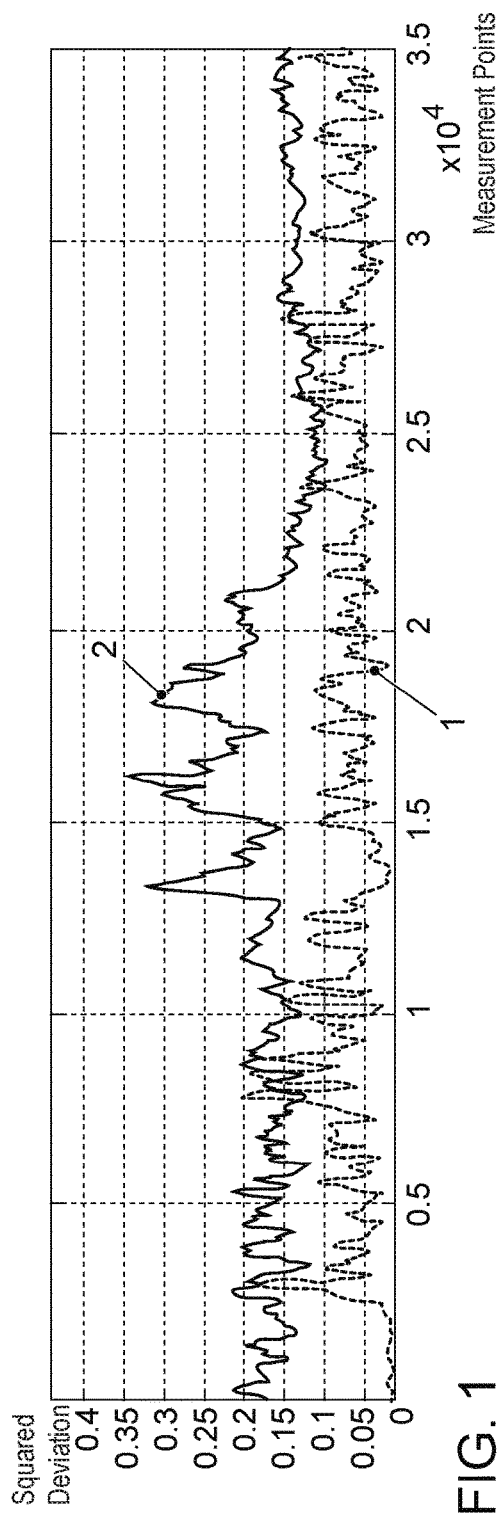

(51) Int. Cl.
*B60W 40/107* (2012.01)
*B60W 30/20* (2006.01)

(52) U.S. Cl.
CPC .......... *G01P 3/80* (2013.01); *B60W 2030/206* (2013.01); *B60W 2510/0638* (2013.01); *B60W 2520/28* (2013.01); *B60W 2710/0644* (2013.01)

(58) Field of Classification Search
CPC ......... B60W 2520/28; B60W 2710/06; B60W 2710/0644
USPC .................. 701/102, 110, 111, 114, 115; 123/406.12–406.14, 406.24, 406.25, 123/406.5, 406.51
See application file for complete search history.

(56) References Cited

U.S. PATENT DOCUMENTS

| | | | |
|---|---|---|---|
| 7,509,201 B2 * | 3/2009 | Bolander | B60W 10/023 701/53 |
| 8,060,275 B2 * | 11/2011 | Asgari | B60W 50/0205 123/406.12 |
| 2003/0040863 A1 * | 2/2003 | Rendahl | F02D 41/18 701/115 |
| 2003/0163242 A1 | 8/2003 | Miyauchi et al. | |
| 2005/0277500 A1 * | 12/2005 | Bitzer | F16H 57/0489 474/1 |
| 2006/0178802 A1 | 8/2006 | Bolander et al. | |
| 2008/0177437 A1 | 7/2008 | Asgari et al. | |
| 2010/0121549 A1 * | 5/2010 | Fukuda | B60W 30/188 701/93 |
| 2015/0013628 A1 | 1/2015 | Eppinger et al. | |

FOREIGN PATENT DOCUMENTS

| | | |
|---|---|---|
| DE | 102006003400 A1 | 7/2006 |
| DE | 102007054082 A1 | 7/2008 |
| DE | 102012004419 A1 | 9/2013 |
| DE | 102012109372 A1 | 4/2014 |

OTHER PUBLICATIONS

International Search Report for International Application No. PCT/EP2015/076473 and translation thereof, dated Feb. 18, 2016.
International Preliminary Report on Patentability for International Application No. PCT/EP2015/076473 including Written Opinion of the International Searching Authority and translation thereof, dated May 30, 2017.

* cited by examiner

METHOD AND ENGINE CONTROL DEVICE FOR IDENTIFYING A LONGITUDINAL JERKING OF A MOTOR VEHICLE

CROSS-REFERENCE TO RELATED APPLICATIONS

This application is a continuation, under 35 U.S.C. § 120, of copending International Application No. PCT/EP2015/076473, filed Nov. 12, 2015, which designated the United States; this application also claims the priority, under 35 U.S.C. § 119, of German Patent Application No. DE 10 2014 224 030.1, filed Nov. 25, 2014; the prior applications are herewith incorporated by reference in their entirety.

BACKGROUND OF THE INVENTION

Field of the Invention

The invention relates to a method and an engine control device for identifying a longitudinal jerking of a motor vehicle.

German Patent Application Publication No. DE 10 2007 054 082 A1, which corresponds to U.S. Patent Application Publication No. US 2008/0177437 A1, discloses a generic method for identifying a longitudinal jerking of a motor vehicle. The motor vehicle has a diagnosis system, wherein, among other things, misfirings are monitored with the diagnosis system. If the road surface is uneven such that a significant longitudinal jerking of the motor vehicle occurs, the misfiring monitoring can supply erroneous signals. The diagnosis system thus has an uneven road detector to determine an average level of the unevenness of the road surface. The wheel speeds of all four wheels are measured with wheel speed sensors. The unevenness of the road surface is identified on the basis of signals of the wheel speed sensors. The changes in wheel speed are identified in order to determine a longitudinal jerking of the motor vehicle and thus an average unevenness of the road surface. This changing wheel speed is initially fed to a high-pass filter in order to remove a slowly changing component of the wheel speed signals which does not reflect the change in wheel speed as a result of unevenness in the road surface. The high-pass filter can use a threshold frequency of 2 Hz. The output signal values of the high-pass filter are subsequently squared and averaged with a further filter over a specific time interval so that an average road unevenness level is generated. If the average road unevenness level exceeds a threshold value, the error output of the misfiring monitoring is deactivated.

A cylinder deactivation which could cause a vibration stimulation in the drive train and thus can also contribute to the longitudinal jerking of the motor vehicle can be used, for example, in order to achieve fuel consumption objectives in motor vehicles.

German Patent Application Publication No. DE 10 2012 004 419 A1, which corresponds to U.S. Patent Application Publication No. US 2015/0013628 A1, discloses a motor vehicle valve drive adjustment device with at least one camshaft. The camshaft has at least two axially displaceably arranged cam elements. At least one cam element of the at least two cam elements has a cam track with a valve stroke and a cam track with a zero stroke for a cylinder deactivation. During cylinder deactivation, at least one cylinder of the internal combustion engine is deactivated, while at least one further cylinder of the internal combustion engine is still fired. An open-loop or closed-loop control unit is provided in order, in at least one deactivation operating state, to operate the at least one cam element with the zero stroke and the at least one other cam element with one of the valve strokes, to which a smaller output is assigned.

The above-described generic method is not yet optimally configured. The generic method is suitable to ascertain a longitudinal jerking of the motor vehicle as a result of road unevenness, but it is possible that the longitudinal jerking is also generated as a result of other influences. Moreover, the generic method is not suitable for avoiding or reducing a longitudinal jerking of the motor vehicle.

SUMMARY OF THE INVENTION

It is accordingly an object of the invention to provide a method and an engine control device for identifying a longitudinal jerking of a motor vehicle which overcome the above-mentioned disadvantages of the heretofore-known methods and devices of this general type and improve the identification of the longitudinal jerking.

With the foregoing and other objects in view there is provided, in accordance with the invention, a method for identifying a longitudinal jerking of a motor vehicle, the method including the steps of:

recording a wheel speed of a driven wheel and a wheel speed of a non-driven wheel; and detecting a longitudinal jerking of the motor vehicle by comparing a change in the wheel speed of the driven wheel with a change in the wheel speed of the non-driven wheel in order to detect a longitudinal jerking as a result of a vibration stimulation in a drive train.

In other words, a method for identifying a longitudinal jerking of a motor vehicle is provided, wherein a wheel speed of a driven wheel and a wheel speed of a non-driven wheel are recorded, wherein the longitudinal jerking of the motor vehicle is detected based on the change in the measured wheel speed, and wherein the change in the wheel speed of the driven wheel is compared with the change in the wheel speed of the non-driven wheel in order to detect a longitudinal jerking as a result of a vibration stimulation in the drive train.

A change in the wheel speed of the driven wheel is compared with the change in the wheel speed of the non-driven wheel in order to detect a longitudinal jerking as a result of a vibration stimulation in the drive train. The vibration stimulation can occur in particular in partial load operation during cylinder deactivation. The change in the wheel speed of the driven wheels and the non-driven wheels as a result of road unevenness are similar since the unevenness acts both on the driven wheels and the non-driven wheels. If a longitudinal jerking occurs as a result of a cylinder deactivation in partial load operation, the change in the wheel speed of the driven wheels is greater than the change in the wheel speed of the non-driven wheels. The change in the wheel speed of the non-driven wheels is caused substantially by the conditions of the road surface. The change in the wheel speed of the driven wheels is caused, on one hand, by the conditions of the road surface and additionally, on the other hand, by vibration stimulations of the drive train, wherein such vibration stimulations can also occur in the case of cylinder deactivation in partial load operation. The change in the wheel speed of the driven heel can thus be used as a measure for the longitudinal acceleration and thus as a measure for the longitudinal jerking.

The changes can be described in particular by in each case a degree of dispersion of the two wheel speeds to be compared. The two degrees of dispersion are compared. If the difference of the degrees of dispersion exceeds a threshold value and a cylinder deactivation is carried out, a longitudinal jerking is identified as a result of a cylinder deactivation. For example, a variance can be used as the degree of dispersion. For this purpose, the deviations of the wheel speeds from an average wheel speed for time-sequential measurements points can be determined and squared. The squared deviations are added together over a specific number of measurement points and divided by the number of measurement values. The number of measurement points depends on the length of the time interval in which the change is considered. Alternatively, a standard deviation, the average absolute deviation or the like can be used as the degree of dispersion.

Thus, a mode of the invention includes determining a degree of dispersion of the wheel speed of the non-driven wheel and a degree of dispersion of the wheel speed of the driven wheel; and comparing the determined degrees of dispersion with one another in order to detect a longitudinal jerking as a result of a cylinder deactivation.

Specifically, a mode of the invention includes determining a variance of the wheel speed of the non-driven wheel and a variance of the wheel speed of the driven wheel as the degrees of dispersion.

It is furthermore conceivable to form, instead of a degree of dispersion, a correlation between the wheel speed of the driven and the wheel speed of the non-driven wheel in order to compare the changes in the wheel speeds.

If the current engine rotational speed lies below a minimum engine rotational speed, no release for cylinder deactivation occurs. If a cylinder deactivation is carried out and a longitudinal jerking has been detected as a result of the cylinder deactivation, in a preferred configuration, a minimum admissible engine rotational speed for release of the cylinder deactivation is adapted in the engine control device. The vibration stimulations of the drive train increase with falling engine rotational speed. The minimum engine rotational speed is therefore preferably increased if a longitudinal jerking has been detected as a result of a cylinder deactivation in order to avoid or reduce the longitudinal jerking as a result of the cylinder deactivation. The minimum admissible engine rotational speed is therefore ascertained and where appropriate adapted for the release of the cylinder deactivation. The minimum admissible engine rotational speed can be correspondingly increased if a longitudinal jerking has been identified by the comparison of the degrees of dispersion or variances of the wheel speeds of the driven and non-driven wheels. As a result, the adaptation of incorrect minimum engine rotational speeds can be avoided. The minimum engine rotational speed can depend on further parameters. One of the further parameters can be in particular the temperature.

Thus, a mode of the invention includes increasing a minimum admissible engine rotational speed for releasing, i.e. enabling, a cylinder deactivation if a longitudinal jerking as a result of the cylinder deactivation is identified.

A mode of the invention accordingly includes measuring an engine rotational speed when a longitudinal jerking occurs as a result of the cylinder deactivation, and increasing the minimum admissible engine rotational speed for releasing the cylinder deactivation to a value above the measured engine rotational speed.

Different gear stages are preferably assigned to different minimum admissible engine rotational speeds for release of the cylinder deactivation. The occurrence of vibration stimulations can be dependent on the engaged gear stage. As a result of the different minimum admissible engine rotational speeds for release of the cylinder deactivation, the longitudinal jerking owing to the cylinder deactivation can be avoided and consumption advantages as a result of the cylinder deactivation can be achieved.

Another mode of the invention therefore includes assigning different minimum admissible engine rotational speeds for releasing the cylinder deactivation to respective different gear stages.

It is conceivable that half of the cylinders are deactivated in order to ensure a uniform ignition sequence. As a result of this, the ignition spacing is doubled and a different vibration stimulation acts on the vehicle. In particular in the case of transversely installed engines, this could lead to vehicle vibrations in the longitudinal direction, what is known as longitudinal jerking, wherein the longitudinal jerking can, however, be identified by the presented method and can be avoided by adapting the minimum engine rotational speed. If it is not half, but rather a different proportion of the cylinders which are deactivated, a non-uniform ignition sequence is produced which can be more difficult to control in terms of vibration technology.

The above-mentioned method is implemented in particular in an engine control device. The method can be realized by software. As a result of this, no new or additional components are required and there are thus no additional material costs. Thus, an engine control device for an open-loop and/or closed-loop control of an internal combustion engine is provided, wherein the engine control device is configured to carry out the above-described method steps.

According to the invention there is thus provided, an engine control device for an open-loop and/or a closed-loop control of an internal combustion engine, wherein the engine control device is programmed to carry out a method for identifying a longitudinal jerking of a motor vehicle, including the steps of recording a wheel speed of a driven wheel and a wheel speed of a non-driven wheel, and detecting a longitudinal jerking of the motor vehicle by comparing a change in the wheel speed of the driven wheel with a change in the wheel speed of the non-driven wheel in order to detect a longitudinal jerking as a result of a vibration stimulation in a drive train.

The above-mentioned disadvantages are avoided and corresponding advantages are achieved through the use of the method and the engine control device according to the invention. There are a plurality of possibilities of configuring and further developing the method according to the invention. For this purpose, reference is made to the dependent claims.

Although the invention is illustrated and described herein as embodied in a method and an engine control device for identifying a longitudinal jerking of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE SEVERAL
VIEWS OF THE DRAWING

Figure 2:
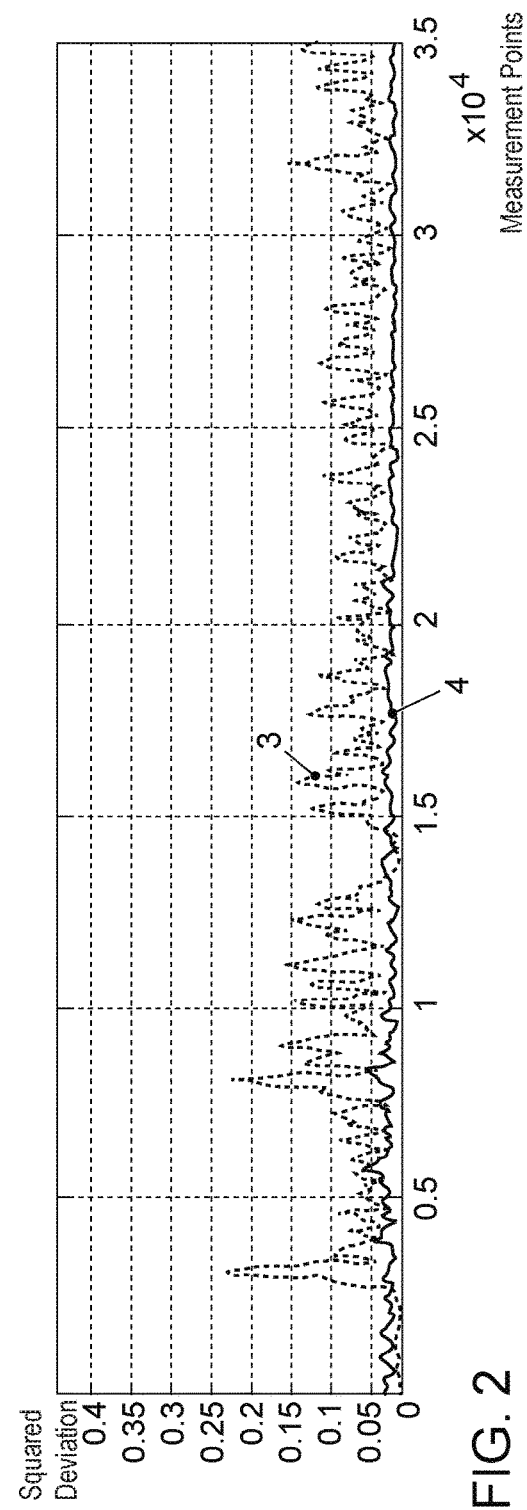
Figure 3:
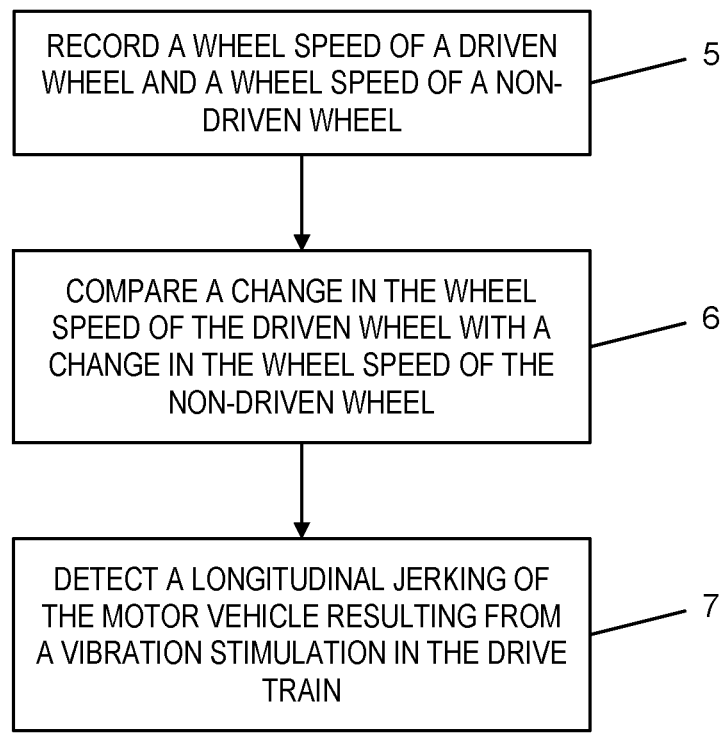

FIG. 1 is a schematic diagram illustrating a squared deviation of a measured wheel speed from an average wheel speed of a driven wheel plotted over a plurality of measurement points in accordance with the invention, once when driving over cobblestone and once when driving over a flat section, wherein a longitudinal jerking caused by a cylinder deactivation occurs;

FIG. 2 is a schematic diagram illustrating a squared deviation of a measured wheel speed from an average wheel speed of a non-driven wheel plotted over a plurality of measurement points in accordance with the invention, once when driving over cobblestone and once when driving over a flat section; and FIG. 3 is a flowchart illustrating in an exemplary manner basic steps of the method for identifying a longitudinal jerking of a motor vehicle in accordance with the invention.

DETAILED DESCRIPTION OF THE INVENTION

A method for identifying a longitudinal jerking of a motor vehicle can be described below on the basis of FIG. 1 and FIG. 2. A longitudinal jerking of the motor vehicle can occur as a result of an uneven road surface and/or as a result of vibration stimulations which occur in the drive train.

Cylinder deactivation can be carried out in order to achieve fuel consumption objectives. Half of the cylinders are preferably deactivated. In a preferred configuration of the motor vehicle, the motor vehicle can have an internal combustion engine with four cylinders. It is, however, conceivable that the internal combustion engine has more than four cylinders, for example, six cylinders or eight cylinders or fewer than four cylinders. If half of the cylinders are deactivated, in particular a uniform ignition sequence is ensured. The ignition spacings are thus doubled and different vibration stimulations act on the motor vehicle, in particular on the drive train. In particular in the case of transversely installed engines, this can lead to vehicle vibration in the longitudinal direction, what is known as longitudinal jerking. If only part of the cylinders is deactivated, a non-uniform ignition sequence is produced which can be more difficult to control in terms of vibration technology.

The stimulation and thus the longitudinal jerking increase in particular with falling engine rotational speed. A minimum admissible engine rotational speed therefore preferably exists for the release of cylinder deactivation as a function of the engaged gear stage. As a result of an inexpedient conjunction of tolerances of components involved, longitudinal jerking of individual motor vehicles could arise in the case of excessively low rotational speeds of the internal combustion engine.

The wheel speeds of at least one driven wheel and of at least one non-driven wheel of the motor vehicle are initially recorded. The motor vehicle preferably has several rotational speed sensors which are allocated to the corresponding driven or non-driven wheels. The signals of the rotational speed sensors are also used, for example, by an anti-locking brake system and are suitable for supplying corresponding information about the wheel speeds.

The wheel speeds are determined for several time-sequential measurement points. It is conceivable that the wheel speeds are recorded every 8 milliseconds. In a subsequent method portion, a change in wheel speed, preferably a fluctuation of the wheel speed around a wheel speed average is identified.

Measurement curves 1 to 4 represent the squared deviation of the identified wheel speed from an average wheel speed over time. FIG. 1 depicts two measurement curves 1, 2 which are allocated to a driven wheel. Measurement curves 3 and 4 in FIG. 2 relate to measurements of the rotational speed sensor at a non-driven wheel.

Measurement curves 1, 3 have been recorded for several measurement points, here for approx. 35,000 measurement points in the case of travel at 37 km/h over cobblestone, wherein a third gear stage is engaged.

Measurement curves 2, 4 have been recorded in the case of travel at 46 km/h over a normal, flat section, wherein a sixth gear stage is engaged and a longitudinal jerking has occurred as a result of cylinder deactivation. The road surface is in this case smoother than when travelling over the cobblestones.

The above-mentioned disadvantages are thus avoided in that a change in the wheel speed of the driven wheel is compared with the change in the wheel speed of the non-driven wheel in order to detect a longitudinal jerking as a result of a vibration stimulation in the drive train.

FIG. 3 illustrates in an exemplary manner the basic steps of the method for identifying a longitudinal jerking of a motor vehicle. In step 5, a wheel speed of at least one driven wheel and a wheel speed of at least one non-driven wheel are recorded. In step 6, a change in the wheel speed of the driven wheel is compared with a change in the wheel speed of the non-driven wheel. As described below, a degree of dispersion is preferably used in order to describe the change in the wheel speed. In step 7, a longitudinal jerking is detected based on the comparison of the change in the wheel speed of the driven wheel with the change in the wheel speed of the non-driven wheel.

As is apparent from the comparison of measurement curves 1 and 3, comparable changes in the wheel speed occur during travel over an uneven section, for example, a section with cobblestone both at the driven wheels and also at the non-driven wheels.

A longitudinal jerking as a result of a cylinder deactivation can as a result be identified in particular in that the change in the wheel speed at the driven wheel is greater than at the non-driven wheel. Measurement curve 2 (cf. FIG. 1) thus has correspondingly greater values than measurement curve 4 (cf. FIG. 2). The comparison of the measurement curves can be performed by obtaining the variance, i.e. by averaging the represented squared deviations. The variance assigned to measurement curve 2 is correspondingly greater than the variance assigned to measurement curve 4.

It has emerged that the change of the wheel speed around the wheel speed average increases with the longitudinal acceleration of the motor vehicle. A longitudinal jerking of the motor vehicle can thus be identified on the basis of a degree of dispersion, in particular the variance of the wheel speed of the driven and non-driven wheels. A degree of dispersion is preferably used in order to describe the change. A variance can be calculated as the degree of dispersion. Alternatively, a standard deviation can be used as the degree of dispersion. In each case a wheel speed average is formed in order to calculate the variance, in particular at a corresponding interval of time, wherein the variance, namely the sum of the squared deviations of the measured wheel speeds from the wheel speed average divided by the number of measurement points, is calculated.

If a longitudinal jerking has thus been detected with the described method, in particular the minimum engine rotational speed is adjusted, in particular increased, for release of the cylinder deactivation. The vibration stimulation and the longitudinal jerking can be reduced as a result of this. An identification of the longitudinal jerking via wheel sensors is thus possible, wherein this information is used in order to adapt the minimum admissible engine rotational speed for cylinder deactivation.

LIST OF REFERENCE CHARACTERS

1 Measurement curve (cobblestone, driven wheel)
2 Measurement curve (normal section, driven wheel)
3 Measurement curve (cobblestone, non-driven wheel)
4 Measurement curve (normal section, non-driven wheel)
5, 6, 7 Method steps

What is claimed is:

1. A method for identifying a longitudinal jerking of a motor vehicle, the method comprising:
    recording a wheel speed of a driven wheel and a wheel speed of a non-driven wheel; and
    detecting the longitudinal jerking of the motor vehicle by comparing a change in the wheel speed of the driven wheel with a change in the wheel speed of the non-driven wheel in order to detect the longitudinal jerking as a result of a vibration stimulation in a drive train.

2. The method according to claim 1, which comprises:
    determining a degree of dispersion of the wheel speed of the non-driven wheel and a degree of dispersion of the wheel speed of the driven wheel; and
    comparing the determined degrees of dispersion with one another in order to detect the longitudinal jerking as a result of a cylinder deactivation.

3. The method according to claim 2, which comprises determining a variance of the wheel speed of the non-driven wheel and a variance of the wheel speed of the driven wheel as the degrees of dispersion.

4. The method according to claim 2, which comprises increasing a minimum admissible engine rotational speed for releasing a cylinder deactivation if the longitudinal jerking as a result of the cylinder deactivation is identified.

5. The method according to claim 4, which comprises:
    measuring an engine rotational speed when the longitudinal jerking occurs as the result of the cylinder deactivation; and
    increasing the minimum admissible engine rotational speed for releasing the cylinder deactivation to a value above the measured engine rotational speed.

6. The method according to claim 4, which comprises assigning different minimum admissible engine rotational speeds for releasing the cylinder deactivation to respective different gear stages.

7. An engine control device for at least one of an open-loop and a closed-loop control of an internal combustion engine, wherein the engine control device includes a non-transitory computer-readable medium and is programmed to carry out a method for identifying a longitudinal jerking of a motor vehicle, comprising:
    recording a wheel speed of a driven wheel and a wheel speed of a non-driven wheel; and
    detecting the longitudinal jerking of the motor vehicle by comparing a change in the wheel speed of the driven wheel with a change in the wheel speed of the non-driven wheel in order to detect the longitudinal jerking as a result of a vibration stimulation in a drive train.

* * * * *